(12) United States Patent
Wahid et al.

(10) Patent No.: US 12,216,680 B1
(45) Date of Patent: Feb. 4, 2025

(54) HIGH-THROUGHPUT DATA REPLICATION

(71) Applicant: Experian Information Solutions, Inc., Costa Mesa, CA (US)

(72) Inventors: Moied Mohammed Abdul Wahid, Cupertino, CA (US); Xun Lai, San Jose, CA (US); Binh Nguyen, San Jose, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 18/520,304

(22) Filed: Nov. 27, 2023

(51) Int. Cl.
*G06F 16/27* (2019.01)
*G06F 16/23* (2019.01)
*G06F 21/62* (2013.01)

(52) U.S. Cl.
CPC ........ *G06F 16/273* (2019.01); *G06F 16/2358* (2019.01); *G06F 21/6245* (2013.01)

(58) Field of Classification Search
CPC ........................... G06F 16/273; G06F 16/2358
USPC ......................................................... 707/610
See application file for complete search history.

(56) References Cited

U.S. PATENT DOCUMENTS

| | | | |
|---|---|---|---|
| 2016/0092444 A1* | 3/2016 | Dornquast | G06F 11/1464 707/610 |
| 2019/0012341 A1* | 1/2019 | Proctor | G06F 16/2477 |
| 2019/0266276 A1* | 8/2019 | Patel | G06F 16/2365 |
| 2023/0083642 A1* | 3/2023 | Saginawa | G06F 21/6245 726/27 |

* cited by examiner

*Primary Examiner* — Muluemebet Gurmu
(74) *Attorney, Agent, or Firm* — Knobbe Martens Olson & Bear LLP (57) ABSTRACT

Systems and methods are provided for securely replicating data, such as from an on-premises database to remote network-accessible storage, with high throughput and robust security mechanisms. Messages or events may be published via a first message queue service, such as an on-premises message queue service, that are then encrypted, optionally at the field level, before being passed to a managed message queue service. The encrypted messages may then be processed by a replication application configured to split batches of messages into sub-batches that are processed in parallel before being committed to a managed database at the batch level as individual batches complete processing.

18 Claims, 4 Drawing Sheets

HIGH-THROUGHPUT DATA REPLICATION

BACKGROUND

Generally described, various data replication processes have been developed and utilized for duplicating and synchronizing data from an on-premises database to a cloud data service or other remote database or data service. Reasons to duplicate data may include enhancing data availability, fault tolerance, and scalability, as well as better enabling cloud-based applications and services to utilize real-time, up-to-date copies of data mirroring that of an on-premises or other source database. Other benefits or reasons for performing data replication may include mitigating the risks of data loss (such as from hardware failures), improving data access speed, and/or enabling geographically distributed applications to consume the data. Various replication mechanisms are often used, such as snapshot replication, transactional replication, or merge replication, which generally involve capturing changes to the source database and applying them to the destination database or service in order to ensure that both datasets remain consistent and current.

BRIEF DESCRIPTION OF DRAWINGS

Embodiments of various inventive features will now be described with reference to the following drawings. The drawings are provided to illustrate example embodiments described herein and are not intended to limit the scope of the disclosure.

DETAILED DESCRIPTION

Generally described, aspects of the present disclosure relate to systems and methods for securely replicating data with high throughput, such as from an on-premises database to cloud storage or other remote network-accessible storage. Features described herein with respect to data replication provide robust security mechanisms with dynamic and adaptable encryption strategies, such as supporting field-level encryption for personally identifiable information (PII) and/or other sensitive data. In some embodiments, the secure, high-throughput data replication approaches described herein are capable of handling 30,000 events per second with minimal latency. The ability to encrypt PII and/or sensitive data in transit using a dynamic and adaptable encryption strategy makes the approaches described herein particularly well adapted for replicating data in a regulated domain or environment in which security or regulatory compliance is required, such as in storing and processing credit bureau data.

Data replication techniques described herein provide a framework that is flexible and not tied to any particular messaging service or streaming solution. Features, according to some embodiments, include splitting a polled batch into reasonably sized sub-batches, dispatching sub-batches to threads while guaranteeing the message order, allow polling while there are still multiple outstanding batches, and tracking the completion status of sub-batches and batches. As will be further described below, a main thread may be configured to commit completed batches that are asynchronously executed. Additional features may include deadlock mitigation, such as by adjusting parallelism, and scaling to handle volume spikes.

Advantages provided by the data replication techniques described herein relative to existing approaches include improved concurrency, which may be required for certain input/output (I/O) intensive use cases. For example, existing approaches to replicating on-premises data to cloud storage cause significant I/O waits on the database, are often limited to one consumer per thread, often require a large number of network connections, limit concurrency by the number of partitions, and/or require a high overhead in rebalancing. Aspects of the present disclosure additionally provide for better control of one or more of the following: partition assignment (such as supporting explicit assignment and auto assignment), error handling and retry strategy (such as allowing retry at the message level and/or sub-batch level), offset management (either associated with a managed event streaming service or managed database service), graceful shutdown strategy, and/or correctness (such as guaranteed ordering, no data loss, committing only after production async callback occurs, etc.). Further advantages described herein include light-weight logging and metrics collection, such as providing a single logging object used to group events, and one or more application programming interfaces (APIs) to record time and other relevant information.

As will be further described below, aspects of the present disclosure include systems and methods for securely replicating data, such as from an on-premises database to remote network-accessible storage, with high throughput and robust security mechanisms. Messages or events may be published via a first message queue service, such as an on-premises message queue service, that are then encrypted, optionally at the field level, before being passed to a managed message queue service. The encrypted messages may then be processed by a replication application configured to split batches of messages into sub-batches that are processed in parallel before being committed to a managed database at the batch level as individual batches complete processing.

Aspects of the present disclosure are not tied to any specific event streaming service or platform, but rather are flexible to work with a variety of third-party of proprietary event streaming solutions. One example event streaming service is APACHE KAFKA®, which may also operate as a message queue service as referenced herein. As is known in the art, this service and similar services provide event streaming end-to-end with features that include, among others, abilities to (a) publish (write) and subscribe to (read) streams of events (such as in the form of messages), including continuous import/export of data from various systems; (b) store streams of events durably and reliably, and (c) process streams of events as they occur or retrospectively. An event streaming service may organize a log or sequence of events regarding changes to a database (e.g., a state change in a system or database) as a topic. A topic may thus include an ordered set of events stored in a durable manner (e.g., may be replicated across multiple storage instances or systems). In KAFKA® and other event streaming services, an event record (a number of which may be organized as a topic) may also be referred to as a message, and may include a key, value, timestamp and optional metadata, in some embodiments.

Figure 1:
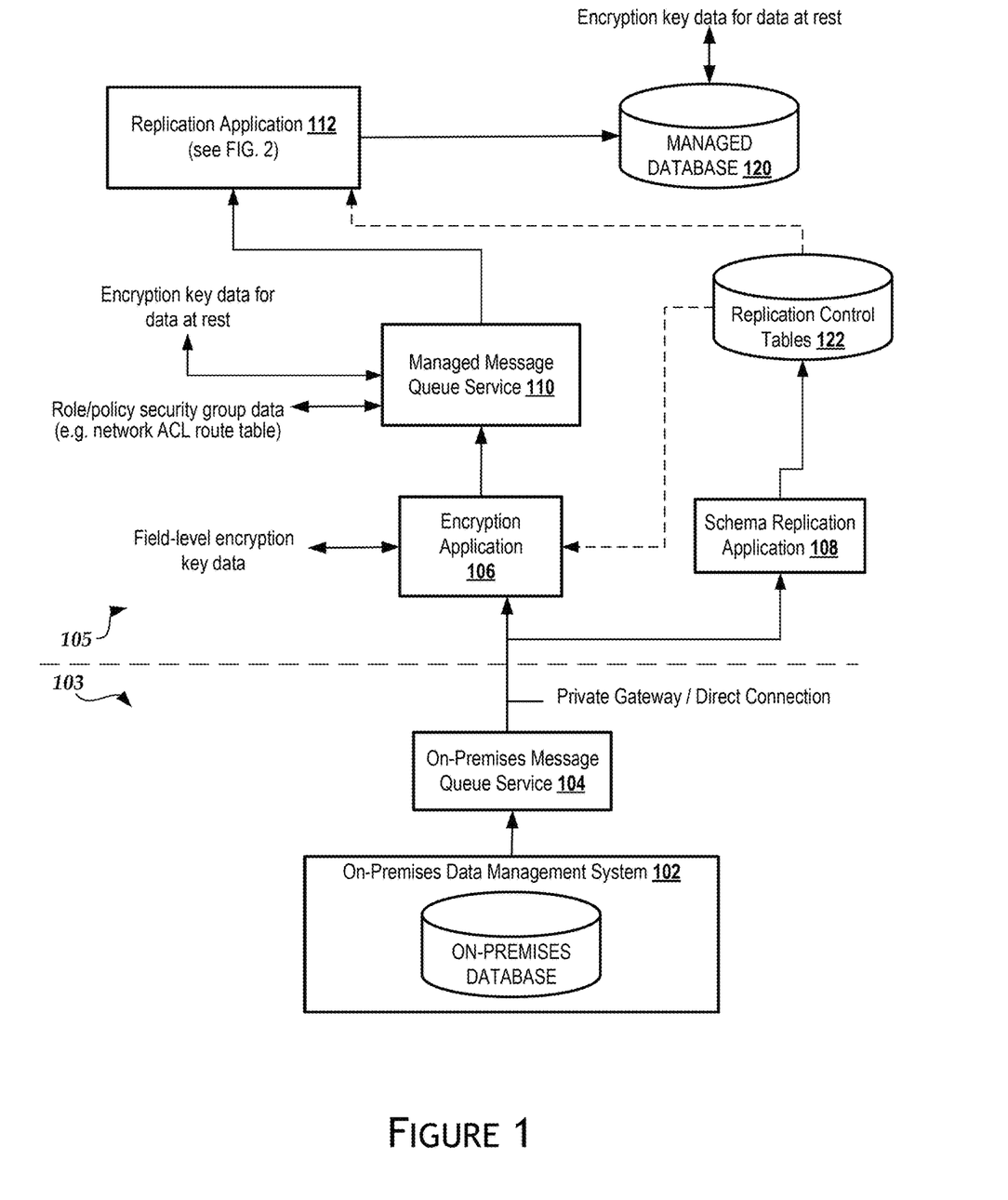
FIG. 1 is a block diagram depicting an illustrative operating environment and various applications and services involved in an illustrative data flow according to some embodiments.

FIG. 1 is a block diagram depicting an illustrative operating environment and various applications and services involved in an illustrative data flow according to some embodiments. As illustrated, components, systems or services 103 (below the dashed line in FIG. 1) may be considered on-premises, while components, systems or services 105 (above the dashed line in FIG. 1) may be considered cloud or remote components, systems or services. It will be appreciated that the cloud or remote components, systems or services 105 may all be operated by a single entity or provider (such as a provider of an on-demand cloud computing platform, web services, and associated APIs), which may execute applications authored and/or controlled in part by an operator of the on-premises database and components 103 as a client or customer of the cloud services provider. In other embodiments, multiple entities may operate different aspects, services or components of the cloud-based or remote services 105.

It will be appreciated that an "on-premises" database or other on-premises component as used herein may generally refer, as commonly used in the art, to refer to a private data center, server and/or other component that a company operates and maintains for that company's purposes, as opposed to a typically multi-tenant structure of cloud computing services in which a third-party service provider makes resources available on an as-needed basis to other companies that contract with the cloud services provider. Accordingly, on-premises as used herein is not intended to necessarily require a particular physical location of hardware (e.g., a company may operate its on-premises servers and databases in a location that is physically remote from a primary place of business for that company). Furthermore, while examples are provided herein of the source database (from which data changes are migrated to another database) being an on-premises database, such as on-premises data management system 102, advantages provided by aspects of the present disclosure are not limited to data and/or associated events originating from an on-premises database as opposed to being used to migrate data from one provider's cloud-based database to another provider's cloud-based database, among other options.

As illustrated in FIG. 1, on-premises data management system 102 may include or be in local communication with an on-premises database. In some embodiments, the on-premises data management system 102 may be a mainframe computer, such as a mainframe computer that stores and manages a master database of credit data or other large-scale regulated data subject to stringent security and/or regulatory requirements. Changes to the database(s) of the on-premises data management system 102 may be published as events or messages via an on-premises message queue service 104. It will be appreciated that the other known features, components, applications or services not illustrated in FIG. 1 may be implemented by the on-premises data management system 102 or other on-premises system in order to prepare, modify or generate data for processing and event publishing by the on-premises message queue service 104. For example, there are various existing solutions and services for data migration that facilitate real-time database streaming and/or publishing of database transactions to message queue services and/or event streaming services. For example, one existing solution that may be utilized according to some embodiments of the present disclosure in order to provide indications of database changes to the on-premises message queue service 104 is Attunity, which implements features for converting database replication data into live data streams for ingestion by KAFKA® or other services.

The on-premises message queue service 104 may be in secure communication with an encryption application 106, which may be a subscriber to database-related events or messages published by the on-premises message queue service 104. In some embodiments, communications from the on-premises message queue service 104 to the encryption application 106 or other service remotely located from the on-premises data management system 102 may be made via a private gateway and/or a direct connection. For example, such communications may be made utilizing a virtual private gateway, a direct connection to a cloud-services provider (e.g., data in transit never touching the public Internet) and/or a hosted connection. A firewall and/or Intrusion Prevention System (IPS) may operate between the on-premises components, systems or services 103 and the remote or cloud-based components, systems or services 105, and such communications may involve mutual authentication (e.g., mTLS). It will be appreciated that while encryption application 106 is illustrated as operating remotely from the on-premises message queue service 104, in other embodiments, the encryption application 106 may operate on-premises, and encrypted messages generated by the encryption application 106 may then be communicated to a cloud-based service (such as the managed message queue service 110) from the on-premises systems 103. In some embodiments, both the on-premises message queue service 104 and managed message queue service 110 (such as a cloud-based service) are persistent and can be self-managed.

In some embodiments, the encryption application 106 may be configured to fetch, retrieve or otherwise obtain one or more encryption keys to encrypt PII and/or other sensitive data within the messages or events received from the on-premises message queue service 104. For example, encryption key data may be obtained via an enterprise key management platform, such as SafeNet KeySecure or other third-party platform or service. Alternatively, the encryption application 106 or an associated service or operator may maintain encryption key data via locally implemented functionality and associated storage. The encryption application 106 may identify fields of the streamed events that contain PII or other sensitive data (e.g., such as by identifying values that include PII or sensitive data via metadata, field names, or other field-level information or tags in the event data), then utilize the obtained encryption key data to encrypt sensitive fields.

As shown in FIG. 1, events from the on-premises message queue service 104 may additionally be subscribed to and received by a schema replication application 108. The schema replication application 108 may be involved in data serialization in association with the cloud storage of replicated data. In some embodiments, Avro or a similar format or solution may be utilized to define the data schema for record values identified in the events or messages from the on-premises message queue service 104. The schema replication application 108 may be configured to analyze schema topic data (such as Avro schema topic data), and write the schema to a lookup table or other structure in the replication control table 122 (which may, for example, include schema lookup data and metadata associated with the associated streamed messages or events). The encryption application 106 may utilize the schema lookup data from the replication control tables 122, in conjunction with encryption key data, to encrypt relevant message data (e.g., PII or other data triggering encryption for security or regulatory purposes according to a particular use case of the present disclosure) utilizing field-level encryption.

The managed message queue service 110 may receive the encrypted PII from the encryption application 106 and generate messages or events that include encrypted versions, where appropriate, of the messages or events previously received from the on-premises message queue service 104. The resulting topics may be encrypted at rest using other encryption key data (such as from SafeNet KeySecure or other platform). The managed message queue service 110 may additionally consult role/policy security group data (such as a network ACL route table) in generating and publishing messages that are subscribed to or listened to by a replication application 112 for processing before committing related changes to one or more managed databases 120. Committing the changes may include, for example, writing change data capture (CDC) data to parity tables in a cloud-based relational database. Processes implemented by the replication application 112 will be further described below with respect to FIG. 2.

Figure 2:
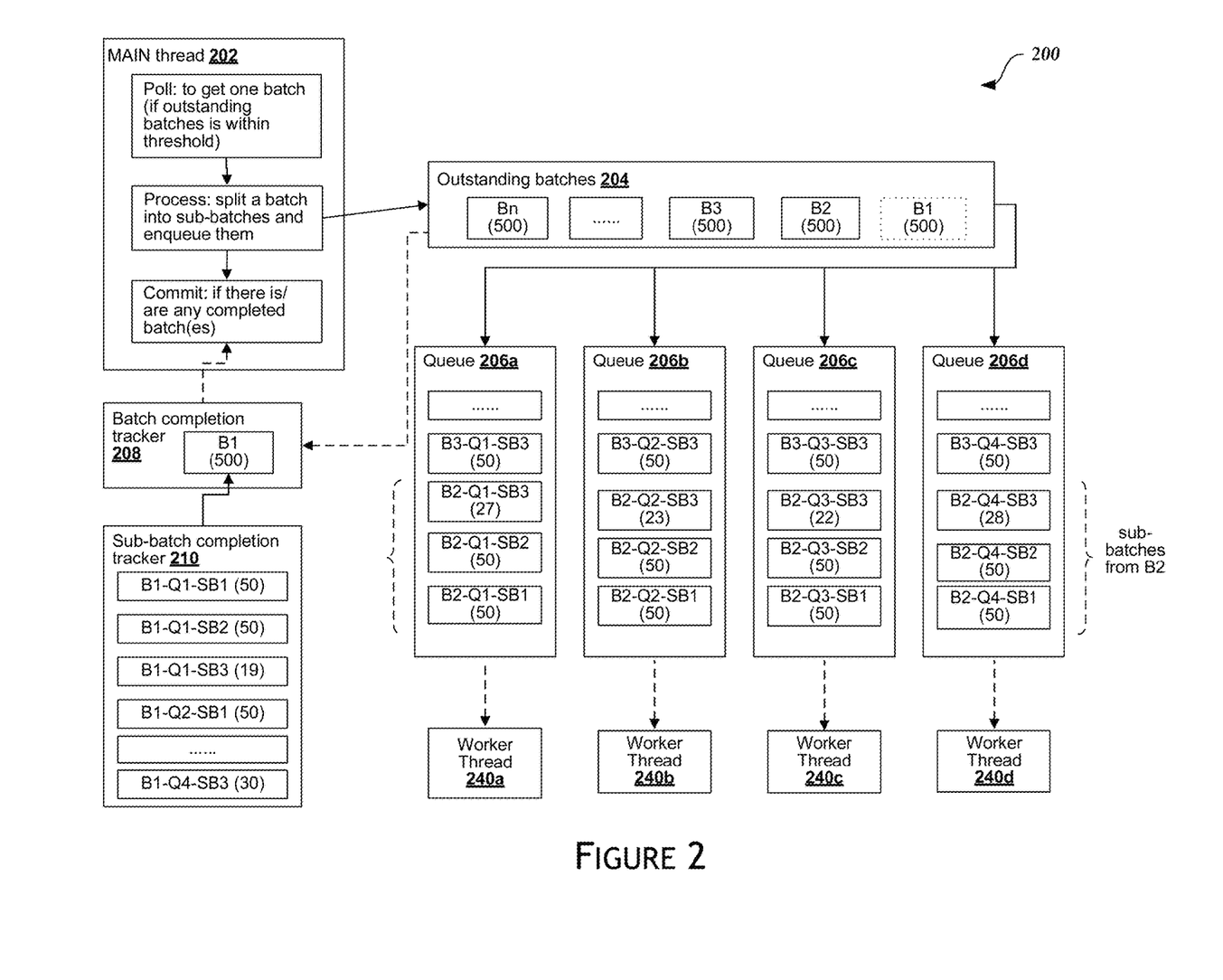
FIG. 2 is a block diagram depicting data flow during parallel batch processing of messages or events during data replication, according to some embodiments.

FIG. 2 is a block diagram depicting data flow 200 during parallel batch processing of messages or events during data replication, according to some embodiments. The components and data flow illustrated in FIG. 2 may occur in or be implemented in association with the replication application 112 discussed above with respect to FIG. 1. As illustrated, a main thread or process implemented by the replication application 112 may obtain a next batch of encrypted messages to process from the managed message queue service 110, such as in response to determining that the outstanding batches of messages 204 remaining for the replication application 112 to process is within a predefined threshold. The batch of messages (which may include, as an example according to some embodiments, 500 messages) may then be split into sub-batches, which are in turn enqueued by adding individual sub-batches to one of queues 206a, 206b, 206c or 206d for processing in parallel. The sub-batches, in some embodiments, may include approximately 40-50 messages, though the target size of sub-batches may be configurable or altered depending on administrator preferences and/or considerations of a particular use case. While four queues are illustrated, it will be appreciated that this is for illustrative purposes only, and that more or less queues may be implemented in a given embodiment.

In some embodiments, various logic and rules may be applied in grouping messages into sub-batches. For example, messages relating to changes to the same table may be grouped in a sub-batch. Sub-batch partitioning, in some embodiments, may be based in part on a message key (such as by hashing the message key and taking the modulo). A message key, in some instances, may tie to a particular database field, and thus may be used to keep messages related to similar data or fields together in a sub-batch. For example, if the message key relates to a field of home address of a person identified in a database, grouping messages based on such a key may keep messages related to changes to database entries for members of the same household (people sharing a mailing address) together in a sub-batch. Messages sharing a common key (same-key messages) may be kept on the same queue as one another to maintain ordering of database changes related to the same database fields. In some embodiments, message ordering may be maintained by both message key and partition.

Each queue 206a-206d may have an associated worker thread 240a-240d. The replication application 112 or another component may be configured to dequeue a sub-batch and pass it to the associated worker thread (which may alternatively be considered a worker application or service). For example, a sub-batch dequeued from queue 206a may be passed to worker thread 240a in order for worker thread 240a to process the individual encrypted messages in the sub-batch. The particular logic implemented by a worker thread may depend on the nature of the use case of the present disclosure and/or the content of the messages, and may include decrypting message contents, producing new messages for publication by a message queue service, etc. As sub-batches are processed, the sub-batch completion tracker 210 may track which sub-batches are completed. The batch completion tracker 208 may determine when all sub-batches of a particular batch have been processed by worker threads, and may provide an indication to the main thread 202 or other process or module responsible for determining when to commit changes to one or more managed databases 120 or other target/destination database(s). The replication application 112 may then initiate a commit to the relevant database(s) for the given batch.

According to the above example process, sub-batches from a second batch may be enqueued for processing prior to messages from a first batch being fully processed. Furthermore, the number of queues for parallel processing may exceed the partition size of the batches/sub-batches.

Figure 3:
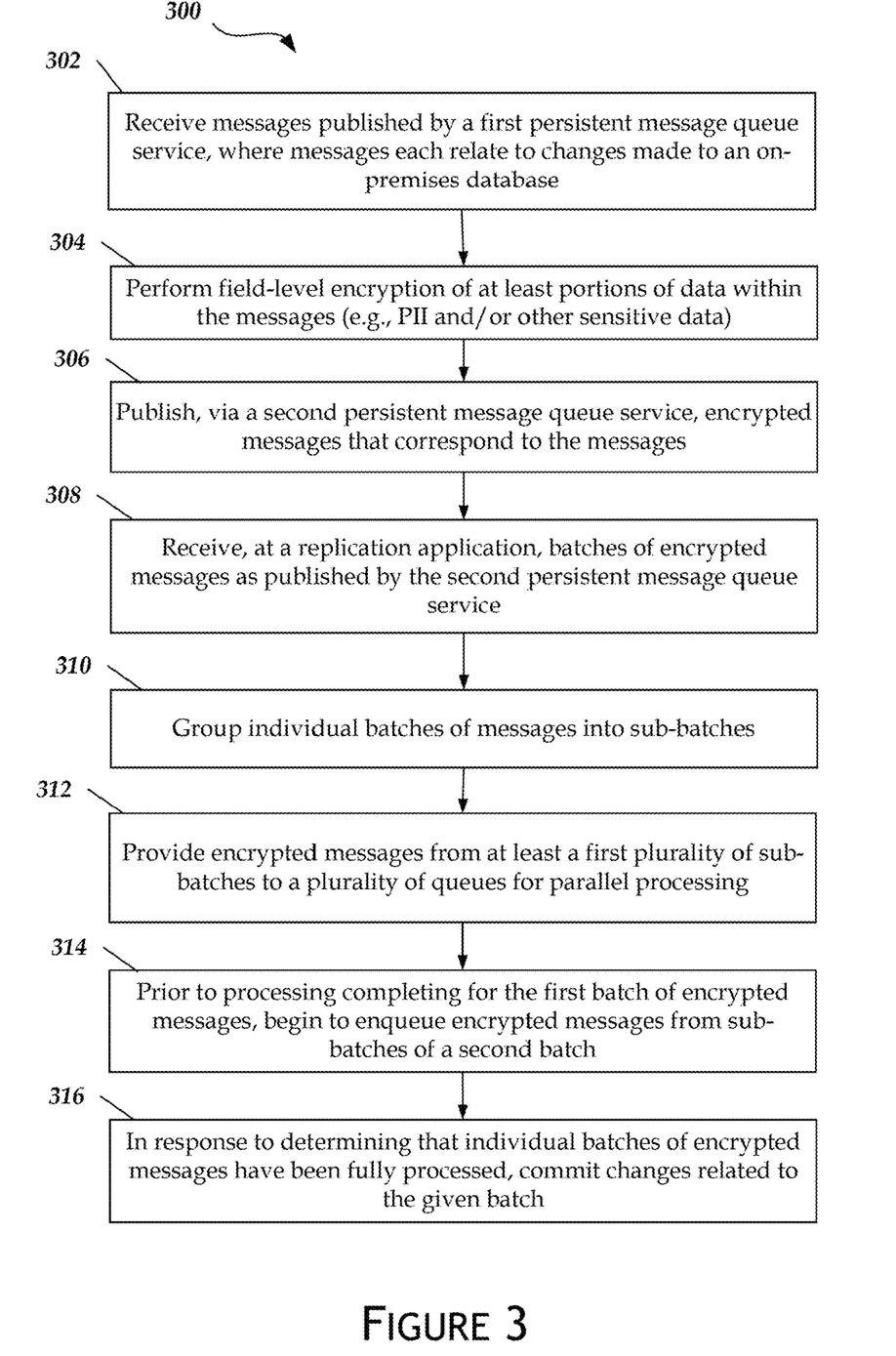
FIG. 3 is a flow diagram of an illustrative method for securely replicating data with field-level encryption, according to some embodiments.

FIG. 3 is a flow diagram of an illustrative method 300 for securely replicating data with field-level encryption, according to some embodiments. Method 300 may be implemented via a cloud service (e.g., one or more servers that operate as part of a system of rapidly provisioned and released computing resources), such as a cloud service configured to implement the encryption application 106, schema replication application 108 and replication application 112 illustrated in FIG. 1. For ease of description, however, the method 300 will be described below with respect to a computing system implementing each block, an example of which is discussed further with respect to FIG. 4.

At block 302, the computing system, such as via the encryption application 106, receives messages published by a first persistent message queue service (such as on-premises message queue service 104), where messages each relate to changes made to an on-premises database, as discussed above. The computing system, such as via the encryption application 106, then performs field-level encryption of at least portions of data within the messages at block 304, such as all PII and/or other sensitive data within the messages, in some embodiments. For example, the encryption application 106 may identify data fields within the messages that include PII (such as a person's social security number, mailing address, full name, etc.) and/or other sensitive or regulated information (such as consumer credit data), as discussed above with reference to interactions of the encryption application 106 and schema replication application 108, and encrypt such fields using encryption key data obtained via an enterprise key management platform or other encryption key source.

At block 306, the system publishes, such as via a second persistent message queue service, encrypted messages that correspond to the messages originally received at block 302 (with appropriate field-level encryption as applied at block 304). At block 308, these messages may be received (e.g., via listening for or subscribing to the messages) by a replication application, such as replication application 112, grouped as batches of encrypted messages. As will be appreciated, the volume of messages may be large, such as tens of thousands or hundreds of thousands of messages per second in some instances.

At block 310, the replication application 112 groups individual batches of messages into sub-batches, as previously discussed above. The grouped encrypted messages may then begin to be provided to queues for processing, such as by initially providing encrypted messages from at least a first plurality of sub-batches to a plurality of queues for parallel processing. At block 314, prior to processing completing for the first batch of encrypted messages, the replication application may begin to enqueue encrypted messages from sub-batches of a second batch (such that some messages in the second batch may be processed in parallel with remaining messages from the first batch). As discussed above, these queues may each be associated with a different instance of a worker process or application that processes the messages as they reach the head of the respective queue. In the case of errors, the system may support retries at the message level or sub-batch level.

At block 316, in response to determining that individual batches of encrypted messages have been fully processed by the respective worker applications, the system may commit changes related to the given individual batch with the network-accessible database service, such that corresponding changes are made to the destination database(s). Additionally, logging operations may be performed, such as maintaining a logging object to group events, and/or implementing APIs to record time and other information that may be useful in a given instance or embodiment. The method 300 may end once there are no batches remaining to process, or a graceful shutdown operation is triggered.

Figure 4:
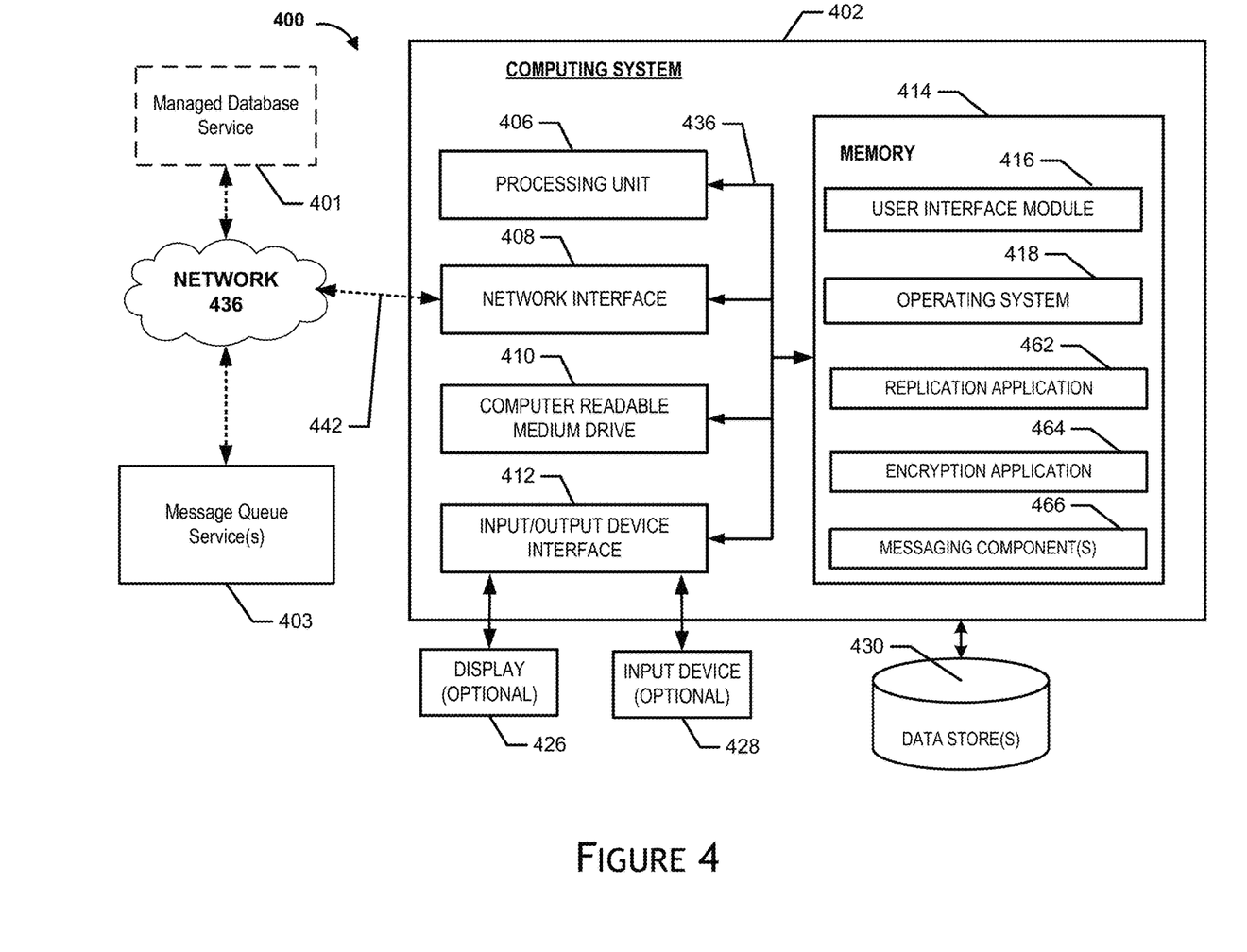
FIG. 4 is a block diagram depicting an illustrative architecture for a computing system that may implement one or more of the features described herein.

In some embodiments, the systems, services and/or servers described herein take the form of a computing system as shown in FIG. 4. FIG. 4 illustrates a general architecture of a computing environment 400, according to some embodiments. As depicted in FIG. 4, the computing environment 400 may include a computing system 402. The general architecture of the computing system 402 may include an arrangement of computer hardware and software components used to implement aspects of the present disclosure. The computing system 402 may include many more (or fewer) elements than those shown in FIG. 4. It is not necessary, however, that all of these generally conventional elements be shown in order to provide an enabling disclosure. In some embodiments, the computing system 402 may implement one or more aspects of the above disclosure, though it will be appreciated that a combination of systems or servers containing similar hardware may collectively implement the features (such as in a cloud environment discussed above) rather than a single system.

As illustrated, the computing system 402 includes a processing unit 406, a network interface 408, a computer readable medium drive 410, an input/output device interface 412, an optional display 426, and an optional input device 428, all of which may communicate with one another by way of a communication bus 436. The processing unit 406 may communicate to and from memory 414 and may provide output information for the optional display 426 via the input/output device interface 412. The input/output device interface 412 may also accept input from the optional input device 428, such as a keyboard, mouse, digital pen, microphone, touch screen, gesture recognition system, voice recognition system, or other input device known in the art.

The memory 414 may contain computer program instructions (grouped as modules or components in some embodiments) that the processing unit 406 may execute in order to implement one or more embodiments described herein. The memory 414 may generally include RAM, ROM and/or other persistent, auxiliary or non-transitory computer-readable media. The memory 414 may store an operating system 418 that provides computer program instructions for use by the processing unit 406 in the general administration and operation of the computing system 402. The memory 414 may further include computer program instructions and other information for implementing aspects of the present disclosure. For example, in one embodiment, the memory 414 may include a user interface module 416 that generates user interfaces (and/or instructions therefor) for display upon a computing system, e.g., via a navigation interface such as a browser or application installed on a user or client device.

In some embodiments, the memory 414 may include a replication application 462, encryption application 464, and/or messaging component(s) 466 (which may each be considered different modules or components executed or otherwise implemented by the system 402), which may be executed by the processing unit 406 to perform operations according to various embodiments described herein. The modules or components may access one or more data stores 430 in order to retrieve data described above and/or store data. The data store(s) 430 may be part of the computing system 402, remote from the computing system 402, and/or may be a network-based service.

In some embodiments, the network interface 408 may provide connectivity to one or more networks or computing systems, and the processing unit 406 may receive information and instructions from other computing systems or services via one or more networks. In the example illustrated in FIG. 4, the network interface 408 may be in communication with a managed database service 401 and/or message queue service(s) 403 via the network 436, such as the Internet or a private network. In particular, the computing system 402 may establish a communication link 442 with a network 436 (e.g., using known protocols, which may include secure communication protocols described above) in order to send communications to the services or systems 401 and/or 403 over the network 436.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a server, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method for securely replicating data to remote network-accessible storage, the computer-implemented method comprising:
　　receiving, by an encryption application, a plurality of messages published by a first persistent message queue service, wherein the plurality of messages each relate to changes made to an on-premises database located remotely from a corresponding network-accessible database service, wherein the network-accessible database service stores at least a portion of data matching corresponding data that was stored in the on-premises database prior to the changes made to the on-premises database;
　　encrypting, by the encryption application, at least personally identifiable information within the plurality of messages at a field level, such that the encryption application separately encrypts individual fields of the personally identifiable information;

publishing, via a second persistent message queue service, a plurality of encrypted messages that correspond to the plurality of messages, wherein the plurality of encrypted messages include personally identifiable information encrypted at a field level as output by the encryption application;

receiving, at a replication application, at least (a) a first batch of encrypted messages of the plurality of encrypted messages as published by the second persistent message queue service and (b) a second batch of encrypted messages of the plurality of encrypted messages as published by the second persistent message queue service, wherein the first and second batches of encrypted messages each include hundreds of encrypted messages;

grouping the first batch of encrypted messages into a first plurality of sub-batches;

grouping the second batch of encrypted messages into a second plurality of sub-batches;

providing encrypted messages from at least the first plurality of sub-batches to a plurality of queues for parallel processing, wherein a different instance of a worker application or service is assigned to process each queue of encrypted messages;

prior to processing completing for the first batch of encrypted messages, beginning to provide encrypted messages from at least the second plurality of sub-batches to at least one of the plurality of queues for processing;

subsequent to beginning to provide the encrypted messages from the at least the second plurality of sub-batches to the at least one of the plurality of queues for processing, determining that the first batch of encrypted messages have been fully processed;

in response to the determining that the first batch of encrypted messages have been fully processed, committing changes related to the first batch of encrypted messages to corresponding data stored by the network-accessible database service; and in response to the determining that the second batch of encrypted messages have been fully processed, committing changes related to the second batch of encrypted messages to corresponding data stored by the network-accessible database service.

2. The computer-implemented method of claim 1 further comprising maintaining ordering of database changes related to a first database field, wherein maintaining ordering includes ensuring that a plurality of messages sharing a common message key are assigned to a same queue as one another.

3. The computer-implemented method of claim 1 further comprising identifying the personally identifiable information, to be encrypted, within the plurality of messages based at least in part on a message key or metadata associated with individual messages.

4. The computer-implemented method of claim 1 further comprising encrypting additional data other than personally identifiable information within the plurality of messages at the field level, wherein at least some messages of the plurality of messages are not encrypted at the field level.

5. The computer-implemented method of claim 4, wherein the additional data that is encrypted at the field level comprises at least one of sensitive data or regulated data.

6. The computer-implemented method of claim 1 further comprising encrypting data at rest in association with the second persistent message queue service, wherein the data at rest is encrypted with different encryption key data than is used to encrypt personally identifiable information at the field level within individual messages.

7. The computer-implemented method of claim 1, wherein the worker application or service assigned to process a first queue of encrypted messages is configured to decrypt message data that was encrypted at the field level by the encryption application.

8. The computer-implemented method of claim 1, wherein the encryption application is configured to obtain encryption key data for encrypting message data at the field level from a key management platform.

9. A system comprising:

memory; and at least one computing device configured with computer-executable instructions that, when executed, cause the at least one computing device to:

receive a plurality of messages published by a first persistent message queue service, wherein the plurality of messages each relate to changes made to an on-premises database located remotely from a corresponding network-accessible database service, wherein the network-accessible database service stores at least a portion of data matching corresponding data that was stored in the on-premises database prior to the changes made to the on-premises database;

encrypt portions of information within the plurality of messages at a field level;

publish, via a second persistent message queue service, a plurality of encrypted messages that correspond to the plurality of messages, wherein the plurality of encrypted messages include portions of information encrypted at a field level;

receive at least (a) a first batch of encrypted messages of the plurality of encrypted messages as published by the second persistent message queue service and (b) a second batch of encrypted messages of the plurality of encrypted messages as published by the second persistent message queue service;

group the first batch of encrypted messages into a first plurality of sub-batches;

group the second batch of encrypted messages into a second plurality of sub-batches;

provide encrypted messages from at least the first plurality of sub-batches to a plurality of queues for parallel processing, wherein a different instance of a worker application or service is assigned to process each queue of encrypted messages;

prior to processing completing for the first batch of encrypted messages, begin to provide encrypted messages from at least the second plurality of sub-batches to at least one of the plurality of queues for processing;

subsequent to beginning to provide the encrypted messages from the at least the second plurality of sub-batches to the at least one of the plurality of queues for processing, determine that the first batch of encrypted messages have been fully processed;

in response to the determining that the first batch of encrypted messages have been fully processed, commit changes related to the first batch of encrypted messages to corresponding data stored by the network-accessible database service; and in response to the determining that the second batch of encrypted messages have been fully processed, commit changes related to the second batch of encrypted messages to corresponding data stored by the network-accessible database service.

10. The system of claim 9, wherein the at least one computing device is further configured to maintain ordering of database changes related to a first database field, wherein maintaining ordering includes ensuring that a plurality of messages sharing a common message key are assigned to a same queue as one another.

11. The system of claim 9, wherein the at least one computing device is further configured to identify the portions of information, to be encrypted, within the plurality of messages based at least in part on a message key or metadata associated with individual messages.

12. The system of claim 9, wherein the portions of information encrypted within the plurality of messages at the field level comprise at least one of (a) personally identifiable information or (b) regulated data.

13. The system of claim 9, wherein the at least one computing device is further configured to encrypt data at rest in association with the second persistent message queue service, wherein the data at rest is encrypted with different encryption key data than is used to encrypt personally identifiable information at the field level within individual messages.

14. The system of claim 9, wherein the worker application or service assigned to process a first queue of encrypted messages is configured to decrypt message data that was encrypted at the field level.

15. Non-transitory computer readable media including computer-executable instructions that, when executed by a computing system, cause the computing system to at least:
   receive a plurality of messages published by a first persistent message queue service, wherein the plurality of messages each relate to changes made to an on-premises database located remotely from a corresponding network-accessible database service, wherein the network-accessible database service stores at least a portion of data matching corresponding data that was stored in the on-premises database prior to the changes made to the on-premises database;
   encrypt portions of information within the plurality of messages at a field level;
   publish, via a second persistent message queue service, a plurality of encrypted messages that correspond to the plurality of messages, wherein the plurality of encrypted messages include portions of information encrypted at a field level;
   receive at least (a) a first batch of encrypted messages of the plurality of encrypted messages as published by the second persistent message queue service and (b) a second batch of encrypted messages of the plurality of encrypted messages as published by the second persistent message queue service;
   group the first batch of encrypted messages into a first plurality of sub-batches;
   group the second batch of encrypted messages into a second plurality of sub-batches;
   provide encrypted messages from at least the first plurality of sub-batches to a plurality of queues for parallel processing, wherein a different instance of a worker application or service is assigned to process each queue of encrypted messages;
   prior to processing completing for the first batch of encrypted messages, begin to provide encrypted messages from at least the second plurality of sub-batches to at least one of the plurality of queues for processing;
   subsequent to beginning to provide the encrypted messages from the at least the second plurality of sub-batches to the at least one of the plurality of queues for processing, determine that the first batch of encrypted messages have been fully processed;
   in response to the determining that the first batch of encrypted messages have been fully processed, commit changes related to the first batch of encrypted messages to corresponding data stored by the network-accessible database service; and
   in response to the determining that the second batch of encrypted messages have been fully processed, commit changes related to the second batch of encrypted messages to corresponding data stored by the network-accessible database service.

16. The non-transitory computer readable media of claim 15, wherein the portions of information encrypted within the plurality of messages at the field level comprise data fields determined to include at least one of (a) personally identifiable information or (b) regulated data.

17. The non-transitory computer readable media of claim 15, wherein the worker application or service assigned to process a first queue of encrypted messages is configured to decrypt message data that was encrypted at the field level.

18. The non-transitory computer readable media of claim 15, wherein the worker application or service assigned to process a first queue of encrypted messages is configured to produce at least one new message published via the second persistent message queue service during processing of at least one message from the first queue.

* * * * *